United States Patent
Veluppillai et al.

(10) Patent No.: US 11,544,637 B2
(45) Date of Patent: Jan. 3, 2023

(54) MANAGING USER PROFILES AND PREFERENCES IN AUTONOMOUS VEHICLES

(71) Applicant: Ford Global Technologies, LLC, Dearborn, MI (US)

(72) Inventors: Mahinthan Veluppillai, Windsor (CA); Doron M. Elliott, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 16/905,390

(22) Filed: Jun. 18, 2020

(65) Prior Publication Data

US 2021/0398027 A1     Dec. 23, 2021

(51) Int. Cl.
| | |
|---|---|
| G06Q 30/00 | (2012.01) |
| G06Q 10/02 | (2012.01) |
| G06F 16/9535 | (2019.01) |
| G06F 16/23 | (2019.01) |
| G06F 21/60 | (2013.01) |
| G06Q 10/04 | (2012.01) |
| G06Q 10/06 | (2012.01) |
| G06Q 50/30 | (2012.01) |

(52) U.S. Cl.
CPC ......... *G06Q 10/02* (2013.01); *G06F 16/2379* (2019.01); *G06F 16/9535* (2019.01); *G06F 21/602* (2013.01); *G06Q 10/047* (2013.01); *G06Q 10/06315* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 2016/0334232 A1* | 11/2016 | Zhuang | G01C 21/3438 |
| 2017/0138749 A1* | 5/2017 | Pan | G01C 21/3438 |
| 2018/0322775 A1* | 11/2018 | Chase | H04W 4/44 |
| 2019/0096250 A1* | 3/2019 | Nix | G08G 1/096833 |
| 2019/0271552 A1* | 9/2019 | Choi | G01C 21/3438 |
| 2020/0104962 A1* | 4/2020 | Aich | G06Q 50/30 |
| 2020/0249042 A1* | 8/2020 | Warr | H04W 4/023 |
| 2021/0241188 A1* | 8/2021 | Buttolo | G06Q 10/02 |
| 2021/0380022 A1* | 12/2021 | Kanitz | B60N 2/01 |
| 2022/0044186 A1* | 2/2022 | Hayama | G06Q 10/063114 |

* cited by examiner

*Primary Examiner* — Mila Airapetian
(74) *Attorney, Agent, or Firm* — Brandon Hicks; Eversheds Sutherland (US) LLP

(57) ABSTRACT

A method includes receiving a message from a requesting device indicating a passenger request for ride services performed by an autonomous vehicle. The system determines, based on the request message, the pooling status of the requested ride services, generates a seat assignment and provides individualized vehicle options to individual users in the vehicle based on profile information in the mission packet.

20 Claims, 6 Drawing Sheets

MANAGING USER PROFILES AND PREFERENCES IN AUTONOMOUS VEHICLES

TECHNICAL FIELD

The present disclosure relates to management of user profiles, and more particularly, to the use of single- and multi-user profiles to enact rider preferences during the use of an autonomous vehicle (AV).

BACKGROUND

Ridehailing companies may utilize user profiles to match users with appropriate vehicles that can accommodate user preferences for vehicle type, seating availability, cargo holding capabilities, and other factors associated with Transportation-As-A-Service. User profiles have also been used to select appropriate vehicles for passengers with disabilities, as described in U.S. Patent Application Publication No. 2017/0316696 A1 ("the '696 publication"). While conventional systems such as those used by ridehail platforms, such as the system disclosed in the '696 publication, utilize a user profile to select an appropriate vehicle for the passenger, conventional profile management systems may not differentiate between multiple passengers traveling under the same profile. Furthermore, conventional systems such as the disclosed system of the '696 publication do not address the use of fully autonomous vehicles (AVs), or address issues associated with the use of single-user and multi-user profiles to manage AV travel. Multi-passenger profiles can be important if a group chooses to travel together with a single account, or if a business uses multi-passenger group profiles for commuting or business travel.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
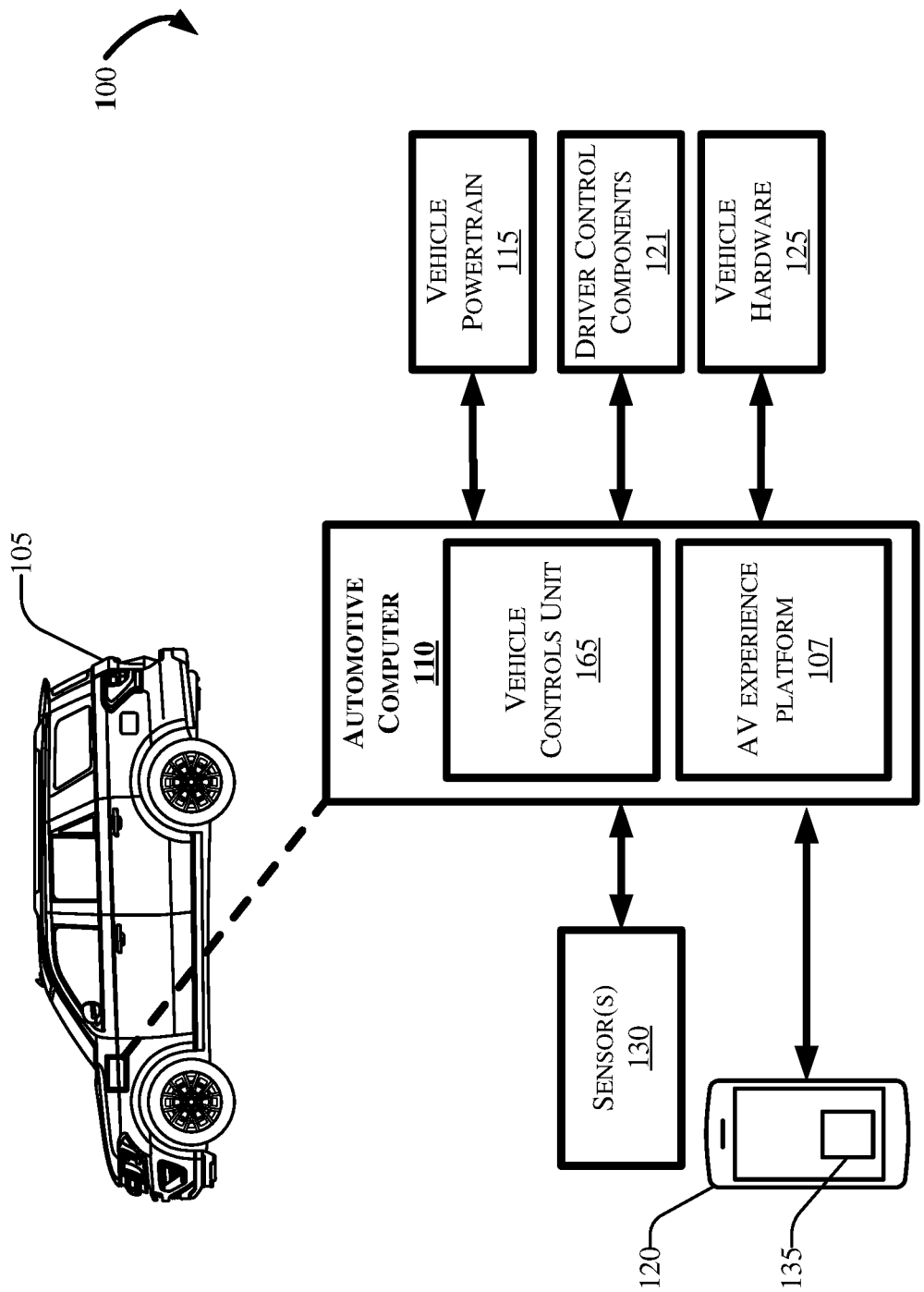
FIG. 1 illustrates an exemplary automotive computer in accordance with the present disclosure.

In an example embodiment, a profile determination system may determine whether an AV transportation request is categorized as a pooled-type or non-pooled-type. In a pooled ride share, multiple riders may travel together in the same vehicle, where each rider has their own profile and user preferences. In a non-pooled ride share, multiple riders may travel together in the same vehicle, where a single profile is used to define the parameters of the trip, and store preferences and limitations for the group of riders.

In an embodiment, the system includes an application instantiated on a mobile device or other computing device to match vehicles (service providers) with users (which can include one or more ridehail passengers seeking on-demand transportation. The system may work with a mobility on demand (MoD) platform to connect the ridehail users to an AV in-service near the requesting device, then direct the AV to pick up the passenger and then drop them off at their desired destination. The disclosed system utilizes user profiles and preferences to control vehicle operation for groups of users riding in the same vehicle, including the manner and order in which the AV passengers(s) are picked up, routed, and dropped off, user seat selection, vehicle cabin climate controls, infotainment options, and other user preferences.

A cost-effective driverless AV system makes efficient use of vehicle selection and routing to provide a trip that accommodates individual user preferences. The disclosed system utilizes individual profiles in an AV ridehail pool, and determines the needs of each individual passenger preferences based on unique passenger profiles. In one aspect, the system learns and remembers a particular seat preference, a number of stops the passenger requests during a trip, a preference indicating a maximum and/or minimum number passengers with whom the user prefers to share a trip, and other user preferences.

In an embodiment, the system determines when a ride is in pooled mode or non-pooled mode and generates a mission packet. The mission packet can include, for example, a ride type (pooled or non-pooled), a ride start and end location, rider profiles, and other information. The system may generate the mission packet according to user instructions, determine individual AV's that are available nearby the requesting device that can accommodate the user instructions, and provide the criteria by which the final AV is chosen. The system may choose the AV among available vehicles in the area, and send the mission packet to the AV, where the automotive computer generates a route between passenger pick-up locations and final destinations. Additionally, the system may provide mission packets having information with which the AV may control an AV experience platform, where users may interact with Seat Display Modules (SDMs) to adjust ambient conditions, access entertainment options, and control other trip aspects according to user preferences.

Disclosed embodiments of the present disclosure may provide seamless and individualized user experiences for ridehail users sharing a ride in an AV, with convenient access to SDMs at each seat of the vehicle.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

As used herein "rider profile," "profile," "user profile," and "rider preferences," describe a persistent collection of user preferences and personal information associated with the user. Such preferences can include, but are not limited to, temperature of the vehicle cabin, the volume and nature of ambient music and other entertainment options, physical features of a desirable vehicle, such as size or number of seats, etc., entertainment options recommended to the user during the trip, the number of passengers who may be present during a shared trip, and other options.

Having a single profile that defines the preferences of a group of riders makes it much easier to pool groups into AV vehicles. When the transportation request is non-pooled, i.e., a single user profile sets forth the preferences and desires of the group, the AV size and type preferences are consistent, the passenger count, routing information, drop-off or pick-up order and others can be determined in advance of the request for transportation. A non-pooled profile can also determine which passenger will have the lead or dominant profile and, in some instances, the ability to over-ride and control, many or all, aspects of the AV trip.

A non-pooled profile may be used when a rideshare group requires a single vehicle from the same pick-up location and the same drop-off destination. However, a non-pooled profile is also useful when a group requires, for example, multiple vehicles or a variety of pick-up locations, since the non-pooled user profile informs the AV vehicle in advance of the order and manner of executing the AV trip to assure all of the group's preferences are met.

A non-pooled profile may also be useful when the group takes up less than an entire vehicle. The group's non-pooled profile may be a single profile that includes group preferences.

FIG. 1 illustrates a functional schematic of an example architecture of an automotive control system 100 (hereafter "system 100") disposed in an AV 105 that may be configured and/or programmed to control aspects of the vehicle, in accordance with the present disclosure.

The vehicle 105 may be any type of passenger vehicle, such as, for example, a sedan, a bus, a van, a truck, etc. In some aspects, vehicle 105 may operate as a manually-controllable vehicle, an autonomous vehicle where driving functionality is performed entirely by a computing platform onboard and/or offboard the vehicle 105, or a semi-autonomous vehicle where aspects of the vehicle control are automatic and other aspects are user-controlled.

The automotive control system 100 may include an AV experience platform 107 disposed in communication with and/or operating on the automotive computer 110, and may further include vehicle control hardware including, for example, a vehicle powertrain 115, one or more driver control components 121, vehicle hardware 125, sensor(s) 130, a mobile device 120, and other components not shown in FIG. 1.

The automotive computer 110 depicts a simplified example of an automotive computing system that may include any number of the engine control units. In one embodiment, the automotive computer 110 may be disposed in and/or distributed in any portion of the vehicle 105 including, for example, an engine compartment (or elsewhere in the vehicle 105), and can include one or more processor(s) (not shown in FIG. 1), and a memory (not shown in FIG. 1) communicatively coupled to the one or more processor(s). The one or more processor(s) are collectively a hardware device for executing program instructions (aka software), stored in a computer-readable memory (e.g., the memory). The one or more processor(s) may embody a custom made or commercially-available processor, a central processing unit (CPU), a plurality of CPUs, an auxiliary processor among several other processors associated with the automotive computer 110, a semiconductor based microprocessor (in the form of a microchip or chipset), or generally any device for executing program instructions.

The automotive computer 110 may operatively connect to and communicate information with one or more internal and/or external memory devices (not shown in FIG. 1) such as, for example, one or more databases, via a storage interface. The storage interface can also connect to one or more memory devices including, without limitation, one or more other memory drives including, for example, a removable disc drive, a vehicle computing system memory, cloud storage, etc., employing connection protocols such as serial advanced technology attachment (SATA), integrated drive electronics (IDE), IEEE-1394, universal serial bus (USB), fiber channel, small computer systems interface (SCSI), etc.

The memory can include random access memory (RAM) such as, for example, dynamic random access memory (DRAM), synchronous random access memory (SRAM), synchronous dynamic random access memory (SDRAM), etc., and read only memory (ROM), which may include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), etc.). Moreover, the memory can incorporate electronic, magnetic, optical, and/or other types of non-transitory computer-readable storage media. In some example embodiments, the memory may also include a distributed architecture, where various components are physically situated remotely from one another, but can be accessed by the one or more processor(s).

The instructions in the memory can include one or more separate programs, any of which including an ordered listing of computer-executable instructions for implementing logical functions. Examples of one such program are described in the following sections. The instructions in the memory may further include an operating system (not shown in FIG. 1).

The automotive computer 110 may further include one or more network adaptor(s) (not shown in FIG. 1) enabled to communicatively connect the automotive computer 110 with the one or more network(s). In some example embodiments, the network(s) may be or include a telecommunications network infrastructure. In such embodiments, the automotive computer 110 can further include one or more communications adaptor(s) (not shown in FIG. 1). The communications adapter(s) can include a global positioning system (GPS), cellular, mobile, and/or other communications protocols for wireless communication.

The sensors 130 may include any number of devices configured and/or programmed to generate signals that help navigate the vehicle 105 when the vehicle is operating in an autonomous mode. The sensors 130 may help the vehicle 105 "see" the roadway and the vehicle surroundings and/or negotiate various obstacles while the vehicle is operating in the autonomous mode. The sensors 130 may include, for example, a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The AV experience platform 107 may be disposed in communication with mobile device 120, which may connect to a Transportation-As-A-Service (TAAS) cloud-based system (e.g., one or more server(s)) and/or may include a TAAS, and provide feedback to the user through a mobile application 135 (hereafter "application 135"). The application 135 may be instantiated on the mobile device 120, and/or may include components distributed to the mobile device 120 as a service application. The mobile device 120 may provide updates to a user profile 300, (described hereafter with respect to FIG. 3A). The application 135 may receive input from the user and provide the input data to the vehicle control unit 165. In one aspect, the vehicle control unit 165 may alter one or more environmental settings in vehicle 105 based upon the preferences stored in the user profile (described in greater detail hereafter with respect to FIG. 3).

Figure 2:
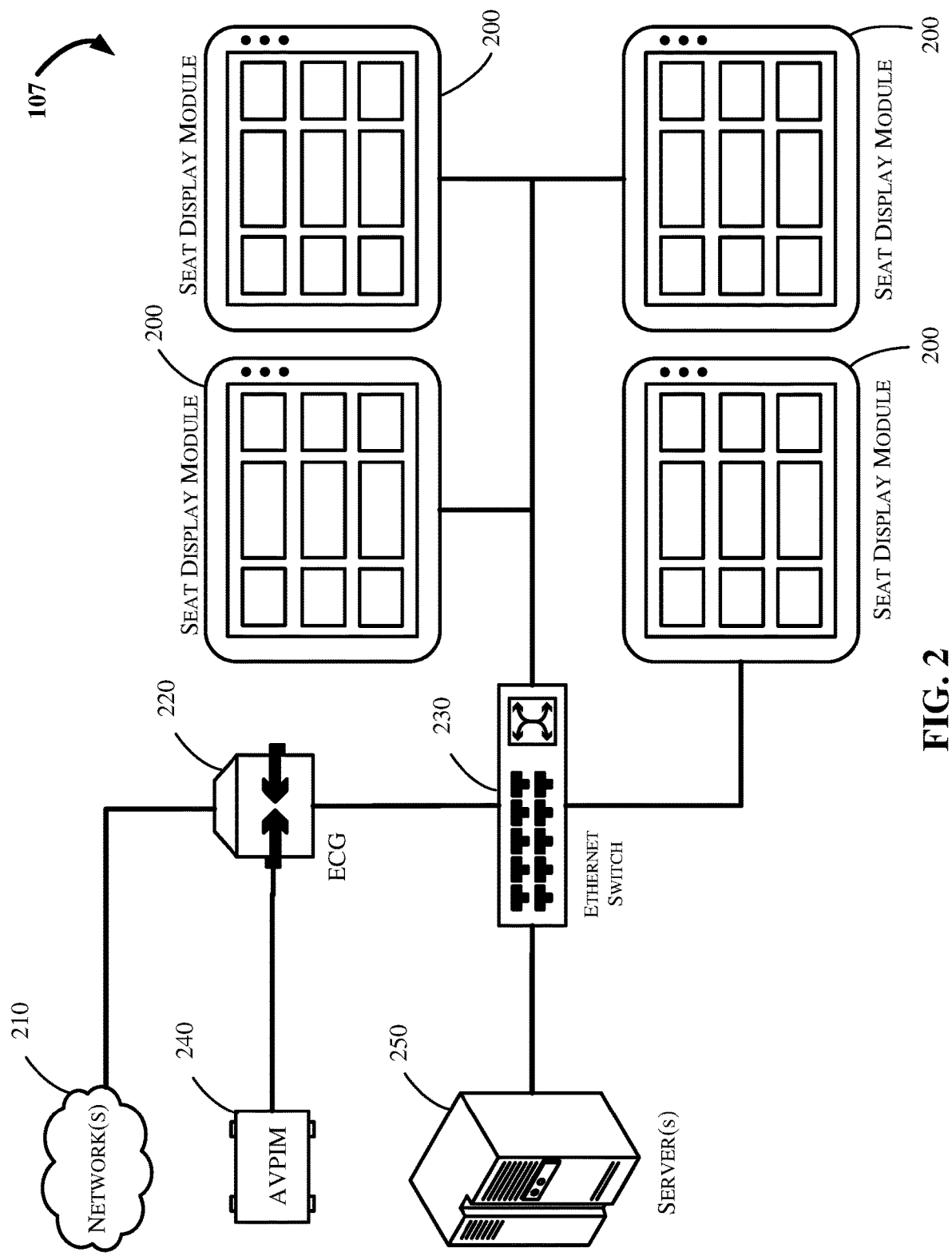
FIG. 2 depicts a functional schematic of an example user profile access system in accordance with the present disclosure.

The AV experience platform 107 may provide access to entertainment features through the application 135, including but not limited to, for example, music, movies, and television programs, etc. In an embodiment, the AV experience platform 107 may be disposed in communication with one or more Seat Display Modules (SDMs) 200, as seen in FIG. 2. The SDMs 200 can receive user input and save aspects of the input as new information stored as part of the user profile 300. The SDMs 200 may also provide access to entertainment features available through AV experience platform 107.

FIG. 2 illustrates a functional schematic of an example architecture for the AV experience platform 107. In one aspect, the automotive control system 100 may store information collected from users via one or more network(s) 210 (discussed in greater detail hereafter in FIG. 4). The network(s) 210 may be disposed in communication with an Electronic Control Gateway (ECG) 220. In one aspect, the AV experience platform 107 may create a user profile (e.g., the user profile 300 as shown in FIG. 3), and store the user profile to a computer-readable memory (not shown in FIG. 2) via the one or more network(s) 210.

In one example embodiment, the AV experience platform 107 may receive a ride request and assign a ride to an AV through transmission of the mission packet. A mission packet can include information, including, for example, a ride type (pooled or non-pooled), a ride start and end location, a seat assignment, the user profile 300, etc. The automotive control system 100 may deliver the mission packet to AV experience platform 107 by an Autonomous Vehicle Platform Interface Module (AVPIM) 240 through the ECG 220.

In one embodiment, the ECG 220 is connected, via an ethernet switch 230, to an auxiliary display module (ADM) 250 and one or more of the SDMs 200. The AV experience platform 107 may designate any one of the ADM 250, SDM 200, or AVPIM 240 as a master node. A designated master node may be responsible for matching user profiles with particular seats, according to where the relevant user is going to sit.

After associating a user profile to a seat, the master node may send the user profile to the SDMs 200. Responsive to receiving the mission packet, the SDMs 200 may display the profile information and trip information on a vehicle display disposed in the AV cabin (not shown in FIG. 2), and receive user input that can include confirmation of the trip information. The ECG 220 may forward the user confirmation to the application 135 and/or the cloud server(s) via the network(s) 210. After the ride is complete (e.g., the AV drops off the user at the intended destination), the master node may update the user profile 300 by transmitting any new information, preferences, etc., to the network(s) 210.

Figure 3A:
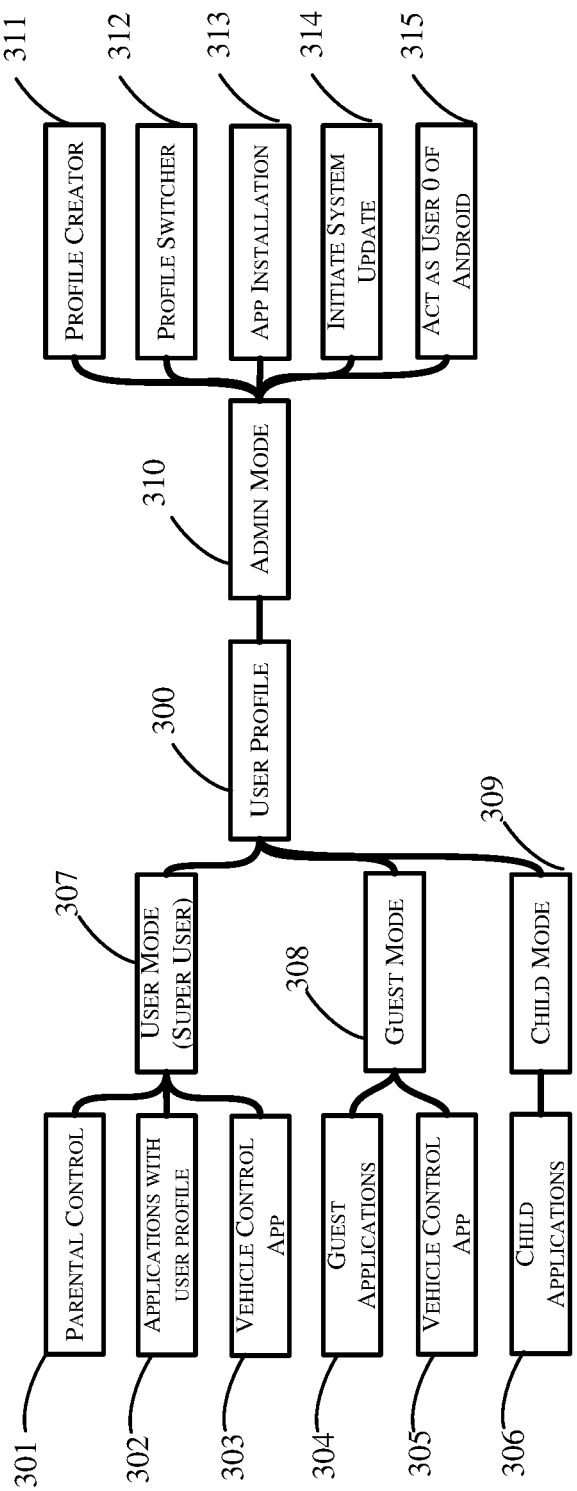
FIG. 3A illustrates an example user profile hierarchy within a pooled ride mode in accordance with the present disclosure.

FIG. 3A depicts an example architecture of user profile modes, according to an example embodiment. The user profile modes can include a User Mode 307, a Guest Mode 308, a Child Mode 309, and an Admin Mode 310.

Respective user profile modes may be associated with one or more control options or permissions. In one aspect, a user may set or change available permissions through the interface on the SDMs 200 or the ADM 250 (see FIG. 2). A system administrator (or "admin") may utilize the Admin Mode 310 in order to access all permissions, including a profile creator 311 with which the admin user may create new user profiles, a profile switcher 312 for switching profiles between seating positions in the vehicle, an app installation feature 313 for installing new apps on the system, an Initiate System Update option for updating the system with software, firmware, etc., and an "Act As" feature 315 that permits the admin user to see a screen display as it would be displayed for a particular user associated with a selected user profile.

In an embodiment, users associated with a user profile 300 can enter the User Mode 307, which allows access to parental controls 301, and provide access to applications 320 that are associated with other user profiles 302. Additionally, User Mode 307 can access a vehicle control app 321.

Without a user profile, a guest user may access a Guest Mode 308, which may provide reduced access according to rules set in the User Mode 307. Example settings or rules can include access permitted to particular users or groups of users, access provided to guest users, and other similar settings. In one example, a guest may access guest applications 304, for example. In another example embodiment, a plurality of entertainment options may be tiered such that the Guest Mode 308 permissions include only certain entertainment options. On the other hand, the User Mode 307 may include a larger or broader entertainment options list, having a changeable scope of variety, type, etc., of entertainment options. In some aspects, the permissions can be set to a Child Mode 309, which may be adjustable in the User Mode 307 to accommodate parental controls that limit access to options for children operating child applications 322. This limitation can be used to prevent children from consuming harmful or undesirable entertainment, for example. The guest mode 308 may also allow the guest user to provide control inputs using the Vehicle Control App 305, which can provide access to climate features associated with the seat position in which the guest may sit. For example, using the Vehicle Control App 305, a guest user may enable a seat warmer, cabin climate controls, etc. Other options are possible.

Figure 3B:
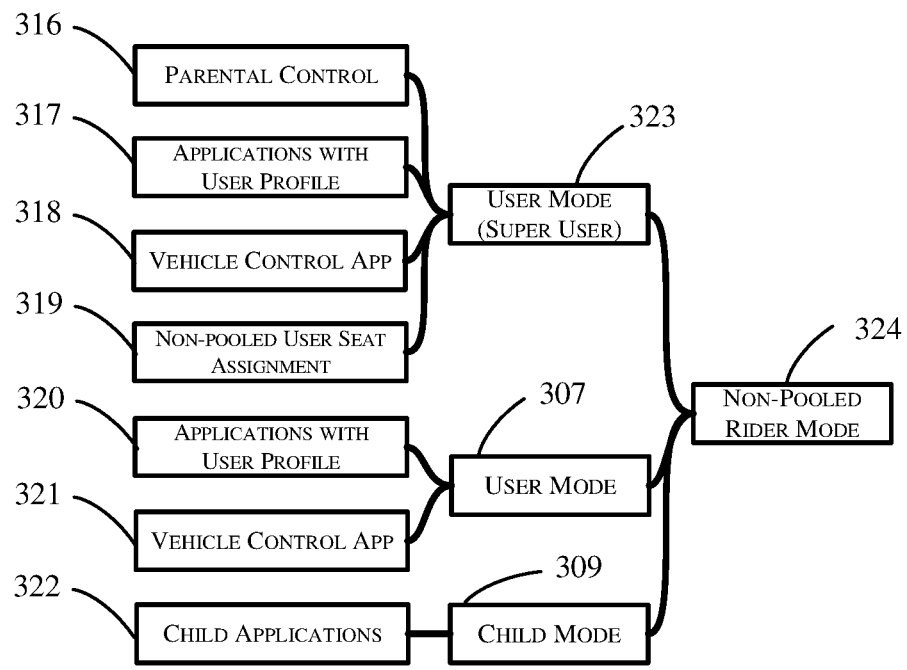
FIG. 3B depicts an example set of rider permissions associated with various modes in a Non-Pooled Rider Mode according to embodiments of the present disclosure.

FIG. 3B depicts an example set of rider permissions associated with a Super User Mode 315 and the user mode 307 in a Non-Pooled Rider Mode 324. A Super User may have full administrative access and control of the system 107. The example depicted in FIG. 3B shows user permissions associated with the Child Mode 309, which can provide user controls for setting permissions associated with child applications 306. In some aspects, permissions may be available to a user through the SDMs 200 and/or the ADM 250, where the SDMs 200 and/or the ADM 250 are configured and/or programmed for the Non-Pooled Ride mode 324.

The Non-Pooled Rider Mode 324 may allow the user profile 300 associated with a primary user to be accessed by multiple SDM's 200. The Super User mode 315 can alter the mode of each of SDM's 200 by altering the Non-Pooled Seat Assignment options 319. Further, the Super User mode 315 may provide access to the Parental Control mode 316, where the super user may add or subtract child access to entertainment and other options. In some aspects, content available to users in the Child Mode 309 may be controllable through the parental Control option 316, which may be accessible on the SDMs 200 and/or the ADM 250 in the Super User mode 315. The SDMs 200, when in the User Mode 307, can also access the Vehicle Control App 318 and other applications that require association with a user profile.

Figure 4A:
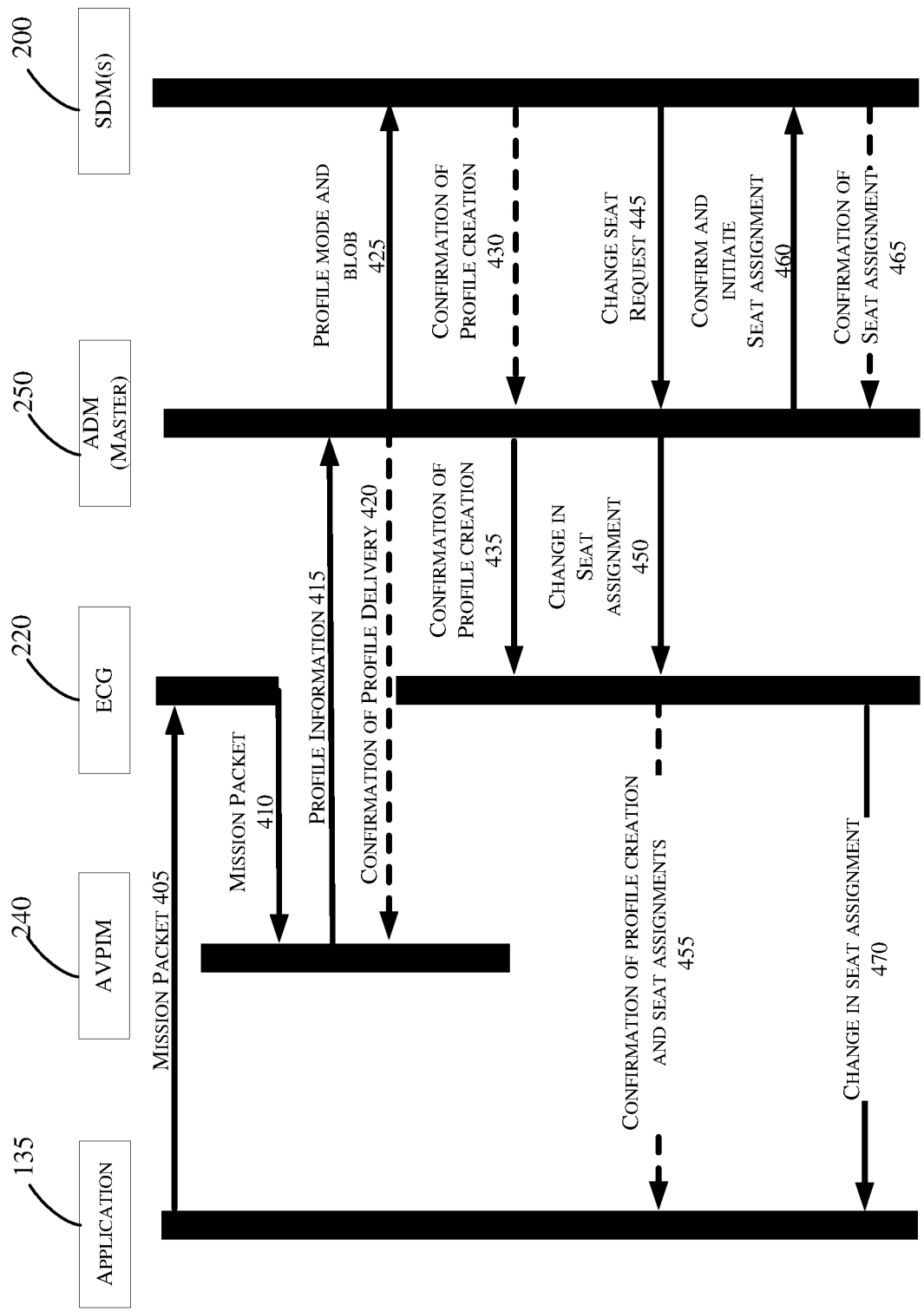
FIG. 4A is a flow diagram of an example method for controlling vehicle options according to embodiments of the present disclosure.

FIG. 4A is a flow diagram of an example method for controlling vehicle options according to embodiments of the present disclosure. FIG. 4A depicts one example of a sequence of events during the creation of a user profile.

At step 405, the Application 135 may send a mission packet (not shown in FIG. 4A) to the ECG 220. The mission packet can include user-defined preferences. The ECG 220 may forward the mission packet to the AVPIM 240 at step 410. The AVPIM 240 or the master ADM may decrypt the mission packet for use by the system.

The AVPIM 240 then sends user profile information to the ADM 250 at step 415. For the purposes of this example, the ADM 250 is designated the master node.

At step 420, the ADM 250 may send a reply to the AVPIM 240, with confirmation that the user profile 300 information was received by the AVPIM 240.

At step 425, the ADM 250 may assign a seat for the user by sending the seat assignment to the SDMs 200 as profile information, and forward the profile mode and blob to the SDM(s) 200, with which the SDM(s) 200 can create the user profile 300. The SDMs 200 may confirm to ADM 250 that user profile 300 has been created at step 430.

At step 435, the ADM 250 sends confirmation and user profile creation information to the ECG 220. At step 440, the ECG 220 may send a confirmation to the application 135 that user profile 300 has been created to application 135, as well as providing application 135 with the user's seat assignment.

The user can request a change in seat assignment using the SDMs 200, at step 445. When a seat change is requested, SDMs 200 may send the request to the ADM 250. The ADM 250 may determine whether another seat is available. If another seat is available, ADM 250 may send the new seat assignment to ECG 220 at step 450. The ECG 220 may also send confirmation of the profile creation and seat assignments to the application 135 at step 455.

The ADM 250 then confirms the seat change to the SDMs 200 at step 460. The SDM(s) 200 may then send confirmation to the ADM 250 at step 465, and update the change in seat assignment with the application 135 at step 470.

Figure 4B:
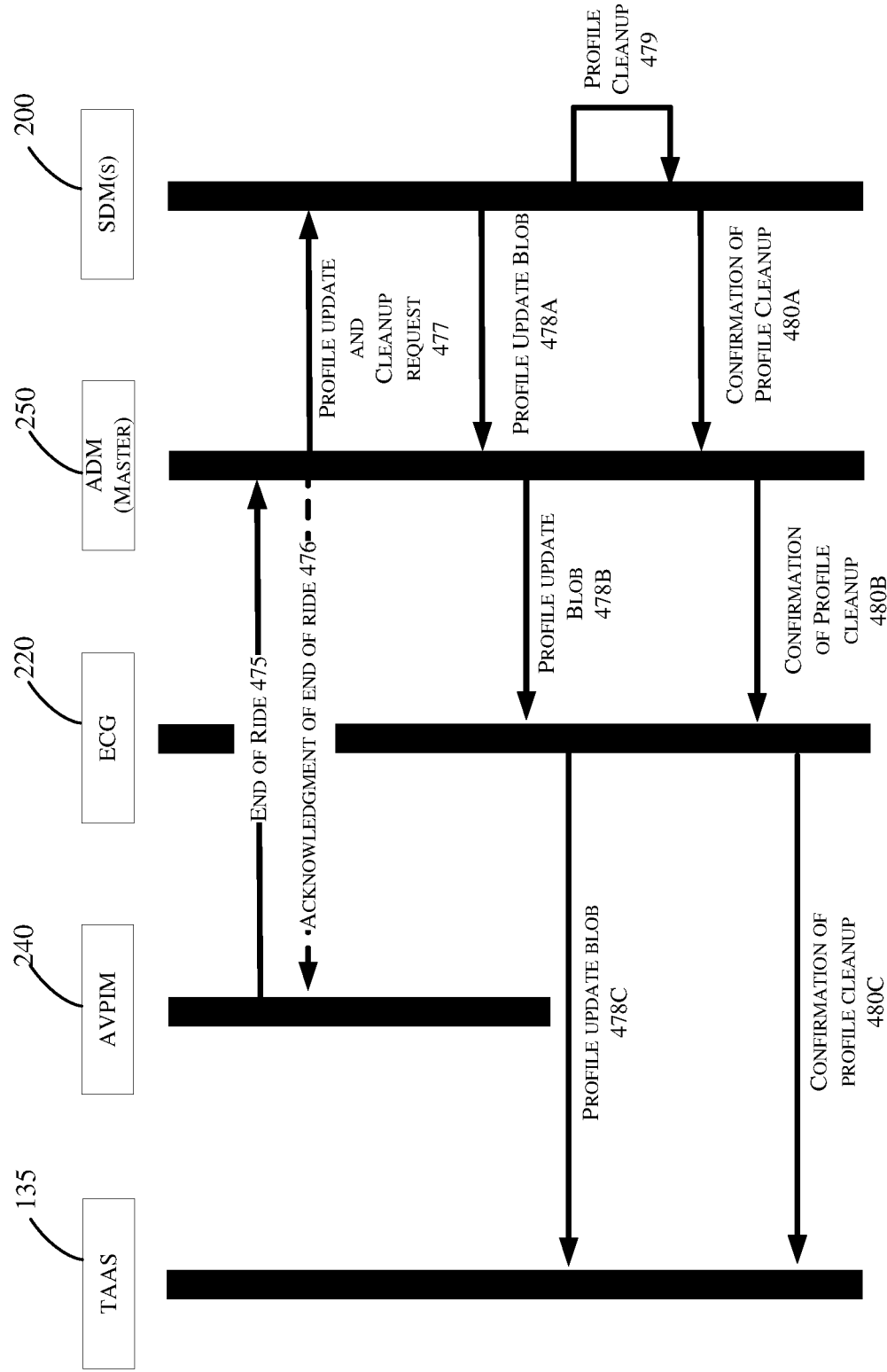
FIG. 4B continues the flow diagram of FIG. 4A for controlling vehicle options, according to embodiments of the present disclosure in accordance with the present disclosure.

FIG. 4B continues a flow diagram for controlling vehicle options, according to embodiments of the present disclosure. At step 475, the AV may determine that the vehicle has completed the transport assignment, signaling an end of the ride. The end of the ride may occur when the AV reaches the target destination, and the riders exit the vehicle.

At step 475, responsive to receiving the notification, the AVPIM 240 may notify the ADM 250 of the end of the ride. At step 476, the ADM may send an acknowledgement of the end of the ride is returned to the AVPIM 240.

At step 477, the ADM 250 may send a profile update and cleanup request to the SDMs 200. The profile update and cleanup request may update records at each respective SDM 200, and purge unneeded profile information from memory.

At step 478A, the SDMs 200 may perform the profile update, and send an updated user profile binary large object (BLOB) 300 to the ECG 220, and send the profile update blob to the ADM 250. The ADM may confirm the profile cleanup, and forward the profile update blob to the ECG 220 at step 478B.

At step 478C, the ECG 220 may forward the profile update BLOB to the application 135 by transmitting the user profile 300, via the network(s) for persistent storage and reference.

At step 479, the SDMs may perform the profile cleanup by saving the updated profile data to a computer-readable memory, and purging cache in the SDMs by deleting prior user profiles from the system memory.

At step 480A, confirmation of the profile cleanup is sent from the SDM(s) 200 to the ADM 250 at step 480A, then to the ECG 220 at step 480B, and finally to the TAAS 135 at step 480C.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Certain words and terms are used herein solely for convenience and such words and terms should be interpreted as referring to various objects and actions that are generally understood in various forms and equivalencies by persons of ordinary skill in the art. For example, words such as "automobile," "vehicle," "car," and "truck" may be used interchangeably and should be understood in the context of the disclosure. Words such as "controls," "signals," "indication," and "information" may be used interchangeably and should be understood in the context of the disclosure. Furthermore, the word "information" as used herein may refer to various items such as digital data, analog data, audio content, video content, and/or messages. These items may be operated upon by a computer containing a processor. Phrases such as "a signal is transmitted" or "a door being opened" should not be construed exclusively in a singular sense. The phrase should be understood to also encompass "a set of signals" that may be transmitted (concurrently or sequentially) to one door and/or to multiple doors. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   receiving, from a requesting device, a request message indicative of a passenger request for ride services from an autonomous vehicle;
   determining, based on the request message, a pooling status of the requested ride services;
   sending, based on the pooling status, a single passenger or multi-passenger mission packet to the autonomous vehicle;
   generating a seat assignment based on the mission packet;
   generating, by the autonomous vehicle, a route;
   sending, to the requesting device, a message comprising the autonomous vehicle and seat assignment;
   loading, by the autonomous vehicle and based on the mission packet, a user mode to the autonomous vehicle and seat; and
   navigating, by the autonomous vehicle and in an autonomous mode, the route.

2. The method according to claim 1, wherein the mission packet comprises a ride type, a ride start location, a ride end location, a seat preference, and a user profile.

3. The method according to claim 2, further comprising:
   receiving, though a seat display in the autonomous vehicle, a user input;
   changing the preferences within the user profile based on the user input; and
   updating persistent storage of the user profile with the changed preferences.

4. The method according to claim 1, further comprising:
   determining that a ride is non-pooled; and
   assigning a master user chosen from one of an electronic control gateway, an auxiliary display module, a seat display module, or a secure decryption module.

5. The method according to claim 1, further comprising:
   determining that a ride is pooled; and
   assigning a master user chosen from one of an auxiliary display module, a seat display module, or a secure decryption module.

6. The method according to claim 1, wherein the vehicle is assigned in order to group together users with common profile attributes.

7. The method according to claim 1, wherein the user mode is one of a standard user, a super user, a child user, a guest user, or an administrator.

8. A system, comprising:
   a processor; and
   a memory for storing computer executable instructions, the processor programmed to execute the instructions to:
   receive, from a requesting device, a request message indicative of a passenger request for ride services from an autonomous vehicle,
   determine, based on the request message, a pooling status of the requested ride services;
   send, based on the pooling status, a single passenger or multi-passenger mission packet to the autonomous vehicle;
   generate, based on the mission packet, a seat assignment;
   generate, by the autonomous vehicle, a route;
   send a message to the requesting device, comprising the vehicle and seat assignment;
   load, by the autonomous vehicle and based on the mission packet, a user mode to the autonomous vehicle and seat; and
   navigate, by the autonomous vehicle and in an autonomous mode, the route.

9. The system according to claim 8, wherein the mission packet comprises a ride type, a ride start location and a ride end location, a seat preference, and a user profile.

10. The system according to claim 9, further comprising instructions to:
    change the preferences within the user profile; and
    update persistent storage of the user profile with the changed preferences.

11. The system according to claim 8, further comprising instructions to:
    determine that a ride is non-pooled; and
    assign a master user chosen from one of an electronic control gateway, an auxiliary display module, a seat display module, or a secure decryption module.

12. The system according to claim 8, further comprising instructions to:
   determine that a ride is pooled; and
   assign a master user chosen from one of an auxiliary display module, a seat display module, or a secure decryption module.

13. The system according to claim 8, wherein the vehicle is assigned in order to group together users with common profile attributes.

14. The system according to claim 8, wherein the user mode is chosen from one of a standard user, a super user, a child user, a guest user, or an administrator.

15. A non-transitory computer-readable storage medium comprising instructions that, when executed by one or more processors, cause the processors to perform acts comprising:
   receive, from a requesting device, a request message indicative of a passenger request for ride services from an autonomous vehicle,
   determine, based on the request message, a pooling status of the requested ride services;
   send, based on the pooling status, a single passenger or multi-passenger mission packet to the autonomous vehicle;
   generate, based on the mission packet, a seat assignment;
   generating, by the autonomous vehicle, a route;
   send a message to the requesting device, comprising the autonomous vehicle and seat assignment;
   load, by the autonomous vehicle and based on the mission packet, a user mode to the autonomous vehicle and seat; and
   navigate, by the autonomous vehicle and in an autonomous mode, the route.

16. The non-transitory computer-readable storage medium according to claim 15, wherein the mission packet comprises a ride type, a ride start location, a ride end location, a seat preference, and a user profile.

17. The non-transitory computer-readable storage medium according to claim 16, further comprising:
   changing the preferences within the user profile; and
   updating persistent storage of the user profile with the changed preferences.

18. The non-transitory computer-readable storage medium according to claim 15, further comprising:
   determine that a ride is non-pooled; and
   assign a master user chosen via one of an electronic control gateway, an auxiliary display module, a seat display module, or a secure decryption module.

19. The non-transitory computer-readable storage medium according to claim 15, further comprising:
   determine that a ride is pooled; and
   assign a master user chosen from one of an auxiliary display module, a seat display module, or a secure decryption module.

20. The non-transitory computer-readable storage medium according to claim 15, wherein the user mode is one of a standard user, a super user, a child user, a guest user, or an administrator.

* * * * *